United States Patent
Gerling

(10) Patent No.: US 6,523,438 B1
(45) Date of Patent: Feb. 25, 2003

(54) PROCESS AND DEVICE FOR SECURING TEETH TO BLANKS

(75) Inventor: Holger Gerling, Aspach (DE)

(73) Assignee: Gerling Automation GmbH, Aspach (DE)

(*) Notice: Subject to any disclaimer, the term of this patent is extended or adjusted under 35 U.S.C. 154(b) by 356 days.

(21) Appl. No.: 09/155,413

(22) PCT Filed: Mar. 27, 1997

(86) PCT No.: PCT/DE97/00650

§ 371 (c)(1),
(2), (4) Date: Sep. 28, 1998

(87) PCT Pub. No.: WO97/37809

PCT Pub. Date: Oct. 16, 1997

(30) Foreign Application Priority Data

Apr. 10, 1996 (DE) .......................... 196 14 197

(51) Int. Cl.⁷ .................... B23K 31/02; B23K 1/00; B23K 37/04; B23D 65/00
(52) U.S. Cl. ............................................. 76/80
(58) Field of Search ................. 76/80; 29/407.01, 29/407.05, 407.1, 703, 707, 709, 714

(56) References Cited

U.S. PATENT DOCUMENTS 4,366,728 A * 1/1983 Beck et al. ................ 76/80 X
5,511,300 A * 4/1996 Merz et al. ............... 29/709 X
5,901,426 A * 5/1999 Okazaki et al. .......... 29/407.05

FOREIGN PATENT DOCUMENTS

DE       3717610       3/1988

* cited by examiner

Primary Examiner—Douglas D. Watts
(74) Attorney, Agent, or Firm—Paul Vincent

(57) ABSTRACT

A method for the attachment of teeth to blanks is distinguished in that a tooth 41 is mounted to a saw blade blank 47 after the tooth 41 and the saw blade blank 47 are measured. The characteristic geometric values of the tooth 41 and the saw blade blank 47 are recorded. Holding means, which can be displaced, align the tooth 41 relative to the saw blade blank 47 or vice versa in such a fashion that the tooth 41 can be attached to the saw blade blank 47 with close tolerance. The disclosed method largely avoids post-processing, e.g. grinding of protruding tooth sides on the saw blade.

12 Claims, 2 Drawing Sheets

PROCESS AND DEVICE FOR SECURING TEETH TO BLANKS

BACKGROUND OF THE INVENTION

The invention concerns an apparatus and a method for the mounting of teeth onto saw blade blanks, wherein the apparatus comprises a tooth introduction device, a receiving device for the saw blade blank, and a mounting device for attaching the teeth to the saw blade blank.

This type of apparatus has become known in the art through DE 37 17 610 C2.

The conventional device facilitates the automatic soldering of hard metal teeth onto a circular saw blade. A rotational device is utilized to position each recess on the blank of the circular saw blade to seat on a hard metal tooth. As soon as the hard metal tooth is adjacent to the blank of the circular saw blade, the tooth is soldered to the blank. After all teeth have been soldered to the blank the saw blade is ground on both sides so that the hard metal tooth sides do not protrude in an unacceptable fashion or irregularly beyond the side surfaces of the blank. If the teeth which are to be soldered are incorrectly positioned on the saw blade blank, the teeth are soldered to the blank with unacceptable orientation and post-processing is required such that the manufactured saw blade has the correct dimensions. This increases the amount of grinding material used. In addition, the teeth used must have a sufficient width. In order to align the teeth with respect to the blank of the saw blade the blank is aligned prior to the soldering process and all the teeth are subsequently soldered. In this procedure there is a particular tolerance with which the teeth can be mounted to the blank independent of the quality of the soldering. Current tolerances, i.e. solderings, have a tolerance range of 0.05 through 0.2 mm relative to a predetermined position on the saw blade blank. The sides of the teeth are subsequently ground so that they do not protrude or, preferentially, protrude evenly.

SUMMARY OF THE INVENTION

It is the purpose of the present invention to create a method and a device which facilitate the attachment of teeth to saw blades in such a fashion that lower tolerances are achieved than in prior art so that the subsequent post-processing procedure can be eliminated or requires substantially less time.

With regard to the method, the purpose of the invention is solved in that the tooth or the teeth and the saw blade blank are measured and, subsequently, the recorded data are analyzed. An analysis unit then determines the configuration of each individual tooth on the saw blade blank so that each tooth is mounted to the saw blade blank to either be flush with the side surface of the saw blade blank or, taken into consideration the dimensioning of the saw blade blank and each individual tooth, is introduced with a minimum tolerance on the saw blade blank with respect to a predetermined position.

The method in accordance with the invention has the substantial advantage that each tooth can be individually adjusted to a recess on the saw blade blank. The individual tooth can be adjusted and centered on the saw blade blank since all local measurements of the tooth as well as the saw blade blank are recorded by an evaluation unit which controls and coordinates the correlation. The method in accordance with the invention achieves tolerances of ≦0.04 mm, i.e. in a direction of the tooth relative to a reference plane. Mechanical wear occurring during prolonged operation of an apparatus can be compensated for to a certain extent, since the positioning of each individual tooth relative to the saw blade blank and vice versa is always newly determined. It is also conceivable that the teeth are measured in advance and that the saw blade blank receives only optimally adjusted teeth so that no or only little post-processing is required. The recorded data of a tooth, for example the width, length, thickness, cut angle and the comparable dimensions of the saw blade blank are fed to an evaluation unit which evaluates this data and optimizes correlations. Should additional post-processing steps be necessary after attaching the tooth to the saw blade in the vicinity of the recess, same require substantially less time.

The designation "minimized tolerance" relative to a predetermined position on the saw blade blank means that the tooth protrudes as evenly as possible beyond both side surfaces or that the teeth protrude evenly beyond one side surface or that alternate teeth at the left and right protrude beyond the side surfaces in a predetermined pattern. The sides of the teeth could also be flush with one side surface and protrude beyond the other side surface in a defined fashion.

The method in accordance with the invention can be particularly advantageous for the production of circular saw blades having large diameters, since, in this case, large tolerances occur which can be substantially compensated for using this method. In this connection, an increased precision means a more even protrusion of all teeth. The resulting reduction in grinding leads to reduced wear on the grinding wheel. Thin saw blades can be produced having better quality, since radially extending tooth sides can be evenly ground on both sides.

In a preferred embodiment of the method in accordance with the invention, the data recorded by the analysis unit for evaluating each tooth and each saw blade blank are converted into signals which activate the holding means for the tooth and/or the saw blade blank to align, in particular center, each individual tooth in a predetermined fashion and correlate each tool with the saw blade blank. The holding means for the tooth or the saw blade blank can be moved in a controlled fashion and the evaluation unit enables the attachment process, e.g. soldering, only after the individual tooth has been optimally positioned on the saw blade blank or vice versa.

In an additional preferred application of the method in accordance with the invention, the aligned association of a tooth with a saw blade blank, is effected in that either the tooth or the saw blade blank or the tooth and the saw blade blank are moved. This measure minimizes the amount of time needed for the desired positioning of each individual tooth on the saw blade and vice versa.

An additional configuration of the method in accordance with the invention provides that the evaluation unit record the width of each individual tooth and the width of the saw blade blank to, using these characteristic values, determine the configuration of each individual tooth on the saw blade blank. This has the advantage that the recording of only two parameters enables control of the positioning of the tooth relative to the saw blade blank in a safe and precise fashion. The method in accordance with the invention permits the width of saw blades (thickness, strengths) to be determined not only qualitatively but also quantitatively so that the conventional subsequent manual adjustment required when using different saw blade blanks, can be eliminated. The method in accordance with the invention separately reevaluates and determines the width of the saw blade blank and, if required, the width of the saw blade blank in the corresponding tooth region and the machine parameters are automatically adjusted to the changed situation.

In a preferred application of the method in accordance with the invention, the teeth are each initially held at their sides by two movable clamp jaws, in particular ceramic jaws, which record the width of each individual tooth and pass this characteristic value to the evaluation unit. The width of the saw blade blank in the vicinity of the first tooth is then recorded and the sensor provided therefor which determines the width of the saw blade blank, passes these data to the analysis unit. The saw blade blank is shifted, with a stationary tooth, into a position at which the tooth can be joined to the saw blade blank. These means allow the desired relevant geometrical data of the tooth and the saw blade blank to be safely determined so that both an economical and reliable determination of the necessary data is guaranteed during permanent operation.

In connection with the method in accordance with the invention, teeth made from hard metal or diamond are preferentially mounted to circular or band-shaped saw blade blanks. The saw blade blank is made from metal, plastic, or a composition material. In the event that very high quality teeth are mounted to the saw blade base body, the method in accordance with the invention has the advantage that the exact alignment of each individual tooth relative to the saw blade blank minimizes post-processing and, in addition, permits reduced overdimensioning. If post-processing on the hard metal or diamond tooth is not required, the difficult grinding process can be essentially eliminated and expensive high quality material remains on the tooth and is not ground-off.

The teeth are preferentially connected to the saw blade blank via a hard soldering process. This joining technique has proved itself and effects a secure material connection even under strong loading.

With regard to the apparatus, the purpose of the invention is solved in that the tooth introduction device has means for determining the width of each individual tooth and the receiving device for the saw blade blank has means to determine the width of the saw blade blank and the apparatus has an evaluation unit for the data determined by the tooth introduction device and the receiving device for the saw blade blank with evaluation unit driving means for positioning the tooth and/or the saw blade blank to locate each individual tooth on the saw blade blank at predetermined positions using the data from the evaluation unit.

The apparatus in accordance with the invention can be of straight forward construction so that the means determining the measuring values and the means recording the measuring values for the tooth and also for the saw blade blank can be easily monitored. The analysis unit controls the processing.

The mechanical means for holding the materials to be combined as well as the means receiving the measured values and the means communicating the measured values as well as the means for displacing the tooth and/or the saw blade blank can be configured in such a fashion that e.g. the hard soldering step can be carried out with great precision in a very short amount of time.

In an additional preferred configuration of the apparatus, the tooth introduction unit has clamping jaws for the tooth by means of which the analysis unit records and evaluates the position of at least one clamp jaw. A sensor is provided for in the receiving device for the saw blade blank which provides data to the analysis unit suitable for determining the width of the saw blade blank in the vicinity of each individual tooth. The receiving device of the saw blade blank has at least one caliper controlled by the analysis unit which displaces the saw blade blank to an exact predetermined position relative to the tooth. These means allow advantageous use of the method in accordance with the invention.

It is also advantageous when the calipers move the saw blade blank, in the event of a circular saw blade blank, along the rotation axis and, in the event of a band-shaped saw blade blank, transverse to an axial extension of the band. This measure allows for each tooth to be fixed in space and the saw blade blank is displaced into a position which guarantees that e.g. the tooth is centered, i.e. protrudes to an equal extent beyond both sides of the saw blade blank or is flush with the side surfaces of the saw blade blank.

The caliper or calipers can be both means for determining the width of the saw blade blank as well as means for displacing the saw blade blank. This type of configuration of the calipers gives the calipers a double function. The configuration of the components in the vicinity of the hard soldering location is simplified.

Clearly in accordance with the invention only one parameter, either on the tooth and/or on the saw blade blank need be measured and evaluated to achieve the required tolerance improvements of the tooth relative to the saw blade blank. The teeth used can also be pre-ground and subsequently attached to the saw blade blank. In addition, use of the method in accordance with the invention and the apparatus in accordance with the invention provides for a substantial improvement in the precision with which the tooth protrudes beyond the saw blade blank.

Further advantages result from the description of the accompanying drawing. The above mentioned features and those to be further described below can be utilized in accordance with the invention individually or collectively in arbitrary combination. The invention is described more closely below with reference to FIGS. 1, 2 and 3.

DESCRIPTION OF THE PREFERRED EMBODIMENT

Figure 1:
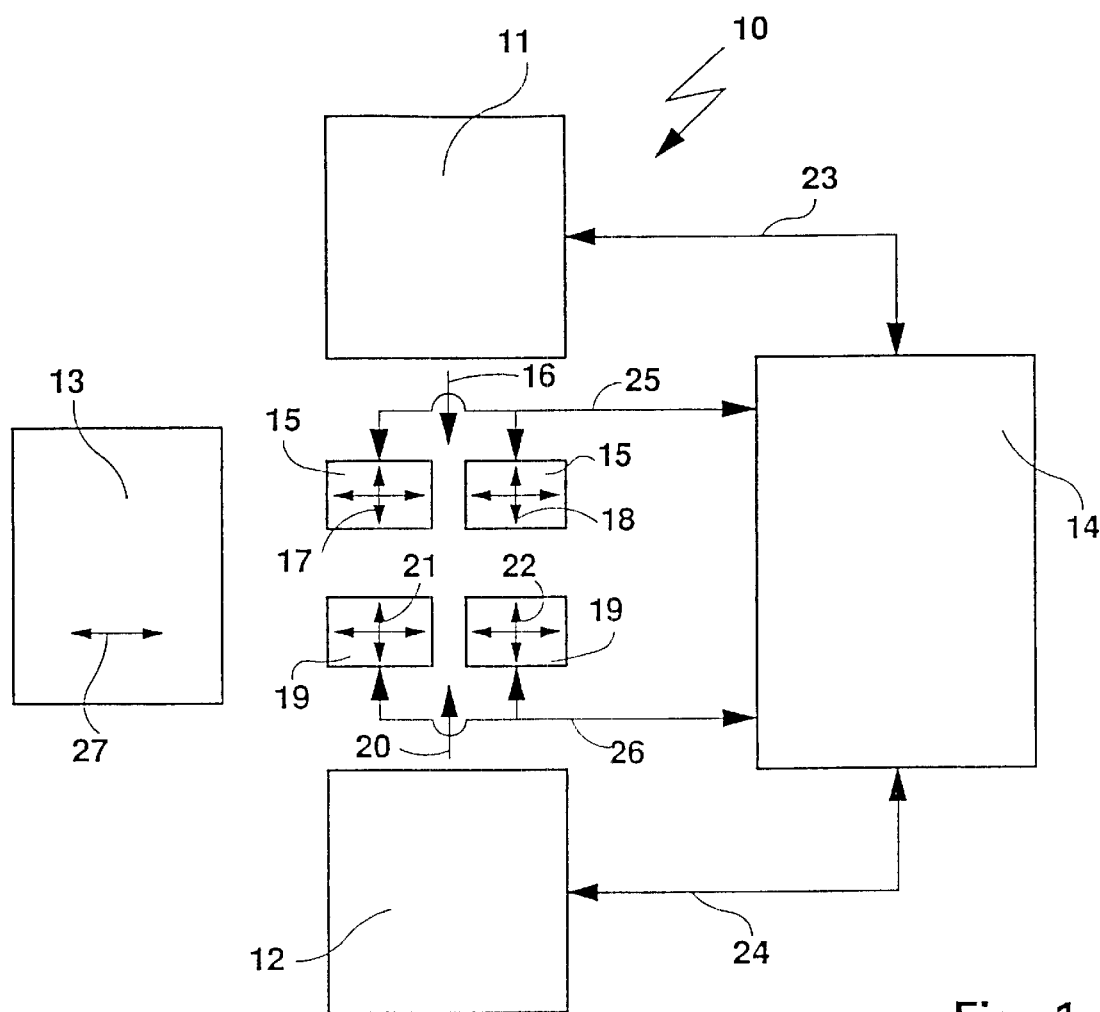
FIG. 1 shows a processing block diagram of the method in accordance with the invention.

The individual figures of the drawing show the method in accordance with the invention and the apparatus in accordance with the invention in a highly schematic fashion and are not necessarily to be taken to scale. Some objects of the individual drawings are highly enlarged so their construction can be more clearly shown.

FIG. 1 shows a processing block diagram 10 of the processing steps of the method in accordance with the invention. A tooth introduction device 11, a tooth receiving device 12 for a saw blade blank, a mounting device 13 and an analysis unit 14 cooperate within the apparatus. Clamp jaws 15 are introduced towards a tooth in the direction of arrow 16 to align, displace or hold the tooth in a stationary location. The clamp jaws 15 can be displaced for engaging the tooth in the direction of arrows 17, 18. A saw blade blank is held proximate to calipers 19 and introduced from the receiving device 12 in the direction of arrow 20 to the calipers 19 or to the tooth held by the clamp jaws 15. The calipers 19 can be displaced in the direction of arrows 21, 22. The holding means for the saw blade blank and the tooth are not shown in the processing block diagram 10. A tooth or a saw blade blank are also not shown in this figure. The calipers 19 and the clamp jaws 15 can record the characteristic geometric quantities of a tooth or of a saw blade blank and the data means 23, 24, 25, 26 pass determined characteristic quantities to the evaluation unit 14. Not all data means must act simultaneously. The evaluation unit 14 evaluates the extracted data and, via data means 25, 26, the clamp jaws 15 and/or the calipers 19 are displaced in such a fashion that the tooth is positioned relative to the saw blade blank in a predetermined manner. The tooth can be centered relative to the saw blade blank, disposed flush at one side, or positioned in a predetermined manner outside of the center relative to the saw blade blank. When the tooth is disposed in the desired manner relative to the saw blade blank, the mounting device 13 travels in the direction of arrow 27 to attach the tooth to the saw blade blank. The tooth is preferentially soldered to the saw blade blank.

In the method in accordance with the invention for attachment of teeth to blanks, the tooth is measured with the width of the tooth being preferentially determined. The saw blade blank is likewise measured and, preferentially, the width of the saw blade blank is thereby determined. The apparatus has means for centering the tooth relative to the saw blade blank wherein, in accordance with the invention, each individual tooth is newly aligned relative to the saw blade blank. It is also possible to align the saw blade blank relative to the tooth. When the desired alignment is completed the mounting process is initiated. The tooth, preferentially a hard metal tooth or a diamond tooth, is soldered to the saw blade blank. When the joining process is completed a new tooth is introduced via the tooth introduction device 11 into the region of the mounting process and the saw blade blank is rotated or displaced to the next recess so that a tooth can be mounted to an additional location on the saw blade blank.

Figure 2:
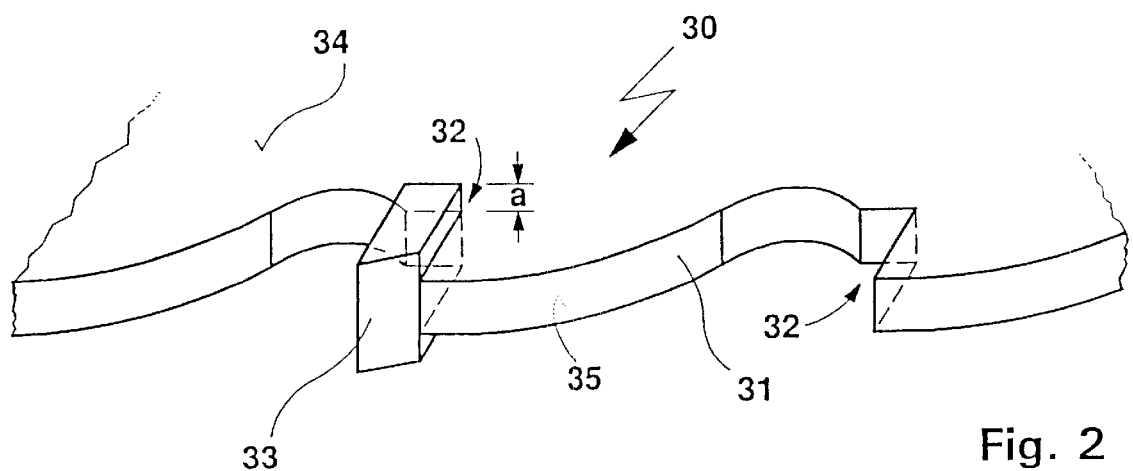
FIG. 2 shows a circular saw blade in a cut view of two teeth, wherein one tooth is attached to the saw blade blank and an additional recess shown on the saw blade blank is adapted for accepting another tooth.

FIG. 2 shows a cut of a circular saw blade 30 showing a saw blade blank 31. Two recesses 32 (plate seats) in the saw blade blank 31 are shown in FIG. 2, wherein a tooth 33 is attached in a recess 32 to the saw blade blank 31, and an additional tooth 33 can be attached to an additional recess 32. The saw blade blank 31 is bordered by two side surfaces 34, 35 whose separation with respect to each other defines the width of the saw blade blank 31. The tooth 33, shown in the figure, is centered on the saw blade blank 31. The tooth 33 protrudes beyond the side surfaces 34, 35 at both sides. The portions of the tooth 33 protruding beyond the side surfaces 34, 35 are ground down in a subsequent processing step. The tooth 33 is preferentially a hard metal or diamond tooth.

Figure 3:
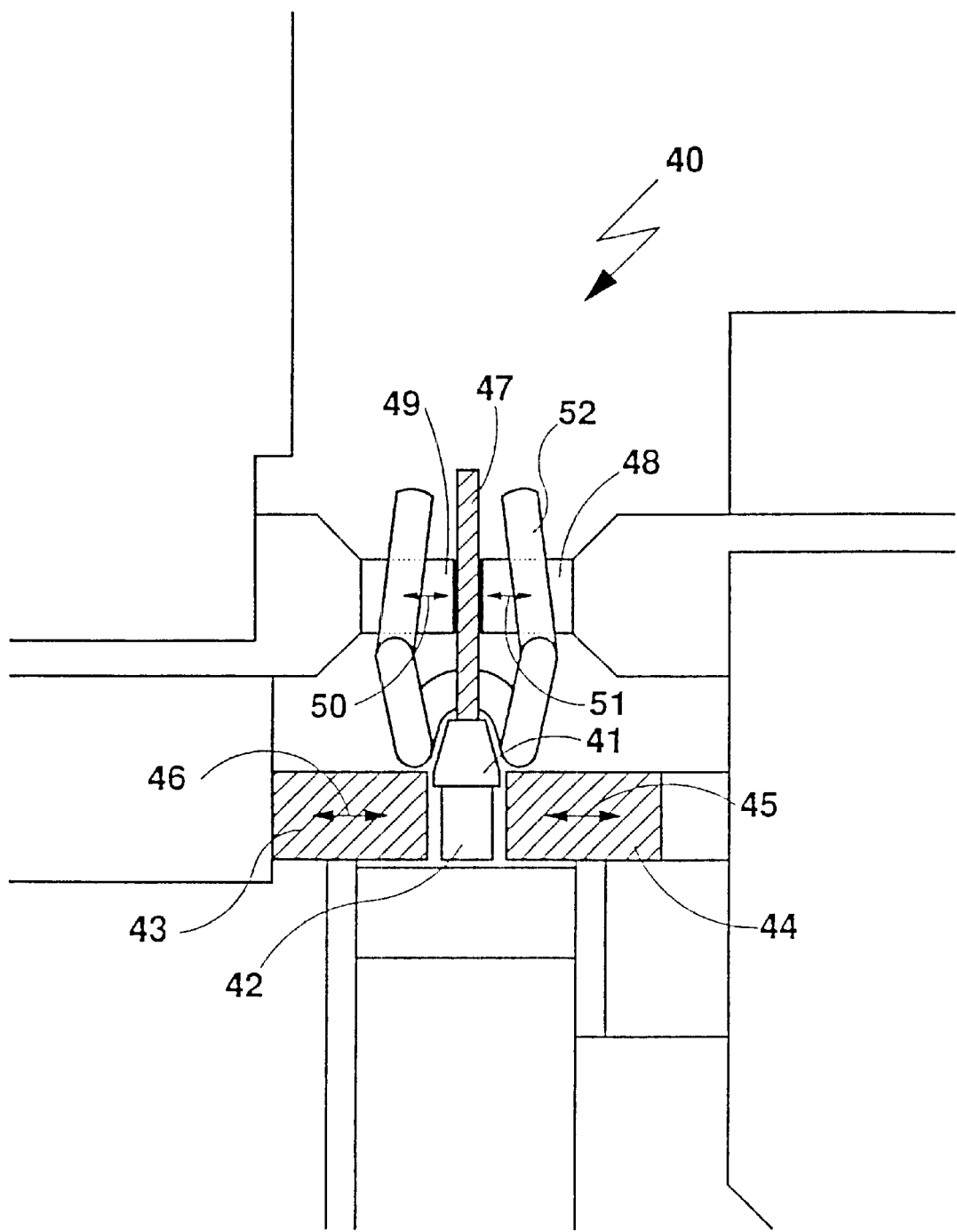
FIG. 3 is a front view of a device in accordance with the invention at the hard soldering location and using means in accordance with the invention for determining the characteristic geometrical quantities of the tooth and of the saw blade blank as well as with means in accordance with the invention for displacing one tooth and/or a saw blade blank in response to instructions from an evaluation unit.

FIG. 3 shows a section of an apparatus 40 in accordance with the invention in the vicinity of the tooth 41 seating on a tooth seating 42. The tooth is held in a stationary manner at its sides by clamp jaws 43, 44. The clamp jaws 43, 44 can travel in the direction of arrows 45, 46. A saw blade blank 47 seats on the tooth 41 in the vicinity of a flat surface of the tooth 41. The saw blade blank 47 is held by means not shown in the figure. Calipers 48, 49 can determine the width of the saw blade blank 47. Calipers 48, 49 can be displaced therefor in the direction of arrows 50, 51. The calipers 48, 49 can position the saw blade blank 47 relative to the tooth 41. The figure also shows portions of an inductor 52 which warms both the tooth as well as parts of the saw blade blank 47 so that the tooth 41 can be soldered to the saw blade blank 47.

Both the clamp jaws 43, 44 and the calipers 48, 49 are connected to an analysis unit (not shown in the figure). This analysis unit controls the clamp jaws 43, 44 and the calipers 48, 49. The analysis unit can receive signals from the clamp jaws 43, 44 and from the calipers 48, 49 representing characteristic geometrical values of the tooth 41 and of the saw blade blank 47. The clamp jaws 43, 44 and the calipers 48, 49 can be controlled by the analysis unit so that the tooth 41 and/or the saw blade blank 47 are displaced and aligned relative to each other. After the tooth 41 has assumed its optimum position relative to the saw blade blank 47, the tooth is attached to the saw blade blank 47.

A measurement sensor 55 can be provided for on the means 48 holding the saw blade blank 47 for passing data to the analysis unit 14 suitable for determining the width of the saw blade blank 47 in the region of each particular tooth.

A method for the attachment of teeth to blanks is distinguished in that a tooth 41 is mounted to a saw blade blank 47 after the tooth 41 and the saw blade blank 47 are measured. The characteristic geometric values of the tooth 41 and the saw blade blank 47 are recorded. Holding means which can be displaced, align the tooth 41 relative to the saw blade blank 47 or vice versa in such a fashion that the tooth 41 can be attached to the saw blade blank 47 with close tolerance. The disclosed method largely eliminates post-processing such as grinding of protruding tooth sides on the saw blade. The teeth are aligned with increased precision on the saw blade blank to reduce grinding and wear of the grinding wheel. Improved precision can be achieved with thin saw blades and narrower blades can be used, since one can operate with reduced over-dimensioning.

I claim:
1. Method for mounting teeth to blanks, comprising the steps of:
 a) measuring a dimension of each individual tooth;
 b) measuring a dimension of a blank;
 c) measuring a position of each individual tooth relative to said blank;
 d) analyzing steps a) through c) to determine a configuration of each tooth on said blank; and
 e) attaching each tooth to said blank to at least one of mount each tooth in flush arrangement with a side surface of said blank and mount each tooth with minimized tolerance at a predetermined position on said blank.
2. The method of claim 1, further comprising:
 c1) converting data recorded in step c) to define each tooth and each blank into signals to activate at least one of a holding means of said tooth and a holding means of said blank to align each individual tooth in a predetermined fashion relative to said blank.
3. The method of claim 2, wherein step c1) comprises at least one of displacing said tooth and displacing said blank.
4. The method of claim 1, wherein step c) comprises at least one of determining a width of each individual tooth and determining a width of said blank to fix said configuration of each individual tooth on said blank.

5. The method of claim 4, wherein each individual tooth is first held at its sides by two displaceable clamp jaws to determine said width of each individual tooth and to transmit said width to an analysis unit and said width of said blank in a vicinity of said tooth is determined by at least one measuring sensor, said width of said blank being transmitted to said analysis unit, and said blank, with said tooth held stationary, being displaced into a position in which said tooth is connected to said blank.

6. The method of claim 1, wherein said tooth is one of hard metal and diamond and said blank is manufactured from one of metal, plastic, and a composite material.

7. The method of claim 1, wherein step d) comprises hard soldering said tooth to said blank.

8. An apparatus for connecting teeth to a saw blade blank comprising:
- a tooth holding means;
- a blank holding means;
- a measuring member cooperating with at least one of said tooth holding means and said blank holding means to determine at least one of a width of each individual tooth and a width of said blank and to determine a relative position of each individual tooth relative to said blank;
- an evaluation unit communicating with said measuring member;
- a displacement member communicating with said evaluation unit and cooperating with at least one of said tooth holding means and said blank holding means to, using data from said measuring member evaluated by said evaluation unit, position each individual tooth to a specific location relative to said blank; and
- a mounting device to connect each individual tooth to said blank at said specific location.

9. The apparatus of claim 8, wherein said tooth holding means comprises clamp jaws for said tooth, said measuring member comprises a measurement sensor for said blank and calipers cooperating with said blank holding means, and said evaluation unit determines at least one of a position of at least one clamp jaw and a width of said blank in a region of each individual tooth and communicates with said displacement member for positioning said blank to an aligned state relative to said tooth.

10. The apparatus of claim 9, wherein said calipers for displacement along a rotational axis of a circular saw blade blank and for displacement transverse to an axial extension of a band-shaped saw blade blank.

11. The apparatus of claim 9, wherein said width of said blank is determined and said blank is displaced.

12. Device for mounting teeth to blanks, comprising
a) means for measuring a dimension of each individual tooth;
b) means for measuring a dimension of a blank;
c) means for measuring a position of each individual tooth relative to said blank;
d) means for determining a configuration of each tooth on said blank; and
e) means for attaching each tooth to said blank to at least one of mount each tooth in flush arrangement with a side surface of said blank and mount each tooth with minimized tolerance at a predetermined position on said blank.

* * * * *